(12) United States Patent
Olson et al.

(10) Patent No.: US 6,952,268 B2
(45) Date of Patent: Oct. 4, 2005

(54) MAGNETIC SHIELD FOR A FIBER OPTIC GYROSCOPE

(75) Inventors: Matthew A. Olson, Glendale, AZ (US); Wesley H. Williams, Phoenix, AZ (US); Jesse Allen Vaught, Westminster, CO (US); Matthew Brady McEwen, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 462 days.

(21) Appl. No.: 10/224,809

(22) Filed: Aug. 21, 2002

(65) Prior Publication Data

US 2004/0036885 A1 Feb. 26, 2004

(51) Int. Cl.[7] .................................................. G01B 9/02
(52) U.S. Cl. ......................................... 356/460; 356/483
(58) Field of Search ................................. 356/459, 460, 356/483, 465; 174/35 MS, 35 R

(56) References Cited

U.S. PATENT DOCUMENTS

| | | | | |
|---|---|---|---|---|
| 4,956,868 A | * | 9/1990 | Carlson | ........................ 381/189 |
| 5,486,922 A | * | 1/1996 | Cordova | ...................... 356/465 |
| 5,488,622 A | | 1/1996 | Mitchell | |
| 5,517,306 A | | 5/1996 | Yakubovich et al. | |
| 5,545,892 A | * | 8/1996 | Bilinski et al. | ......... 250/231.12 |
| 5,602,642 A | | 2/1997 | Bergh et al. | |
| 5,698,784 A | | 12/1997 | Hotelling et al. | |
| 5,786,895 A | | 7/1998 | Mitchell et al. | |
| 5,822,065 A | | 10/1998 | Mark et al. | |
| 5,841,932 A | | 11/1998 | Page et al. | |
| 5,896,199 A | * | 4/1999 | Mark et al. | .................. 356/465 |
| 5,917,983 A | | 6/1999 | Page et al. | |
| 5,939,772 A | | 8/1999 | Hurst et al. | |
| 6,058,760 A | | 5/2000 | Van Heyningen | |
| 6,201,923 B1 | | 3/2001 | Yuhara et al. | |
| 6,242,848 B1 | | 6/2001 | Mori et al. | |
| 6,441,366 B1 | * | 8/2002 | Webb | ..................... 250/231.12 |
| 6,462,824 B1 | * | 10/2002 | McLean et al. | ............. 356/459 |
| 6,627,810 B2 | * | 9/2003 | McEwen et al. | ........ 174/35 MS |

FOREIGN PATENT DOCUMENTS

| | | |
|---|---|---|
| WO | WO 01/81865 A2 | 11/2001 |
| WO | WO 01/81865 A3 | 11/2001 |

OTHER PUBLICATIONS

A.D. King, (1998) *Inertial Navigation—Forty Years of Evolution*, "GEC Review" 13(3):140–149.

Marshall Brain, "*How Gyroscopes Work*", http://www.howstuffworks.com/gyroscope.htm/printable, pp. 1–5.

Replacement of Gyro #4, "*Removal and Replacement of a Gyro*", http://einstein.stanford.edu/highlights/gyro4.html, pp. 1–3.

Copy of International Search Report from International Application PCT/US03/25776.

* cited by examiner

*Primary Examiner*—Gregory J. Toatley, Jr.
*Assistant Examiner*—Patrick Connolly

(57) ABSTRACT

A magnetic shielding system for a fiber optic gyroscope is disclosed. The fiber optic gyroscope may have a sensing coil with a sensing axis. An exemplary magnetic shield may enclose the sensing coil and have a layer including a plurality of pieces connected at a seam. A portion of the seam may be substantially parallel to the sensing axis of the sensing coil. Also, the pieces may be connected together such that each piece has a portion of each of two sides and a wall of the magnetic shield. Additionally, multiple layers having orthogonal seams may be utilized with the magnetic shield.

21 Claims, 5 Drawing Sheets

US 6,952,268 B2

MAGNETIC SHIELD FOR A FIBER OPTIC GYROSCOPE

FIELD OF THE INVENTION

The present invention relates to the field of magnetic shields. More specifically, this invention relates to a mating design of a magnetic shield for a fiber optic gyroscope.

BACKGROUND OF THE INVENTION

Bias sensitivity to magnetic fields is an important performance parameter for optical gyroscopes, such as fiber optic, ring laser, and other similar optical gyroscopes used for inertial sensing. External sources of ambient magnetic fields such as the Earth's magnetic field, electrical machinery, etc., can cause bias errors in an optical gyroscope. For example, for a fiber optic gyroscope used in an inertial navigation system, the allowable magnetic bias sensitivity of the instrument is typically between 0.001 and 0.0001 degrees per hour per gauss (deg/hr/gauss). In contrast, the inherent sensitivity of an unshielded gyroscope is on the order of 1 deg/hr/gauss.

An effective method of minimizing bias sensitivity to an external magnetic field is to reduce the magnitude of the local field by the addition of a magnetic shielding structure ("magnetic shield") around the gyroscope. Magnetic shields are typically made from a high-permeability material that functions as a preferred path for an ambient field. Essentially, the magnetic shield may shunt the ambient magnetic flux around the gyroscope located inside. Thus, the magnetic shield may reduce the effect of an ambient magnetic field on the gyroscope.

Fiber optic gyroscopes may include rotation sensitive optical fiber wrapped into a coil ("sensing coil") in order to detect motion. However, the bias sensitivity of a sensing coil to an external magnetic field may be orientation dependent. For example, the magnetic sensitivity of a depolarized fiber optic gyroscope may be ten times greater in the direction of the rotation sensing axis (e.g., longitudinal axis of the sensing coil) than in the direction perpendicular to the rotation sensing axis. Thus, it is advantageous for magnetic shielding to be most effective parallel to the direction of the sensing axis if the effect of an ambient magnetic field on the bias sensitivity of the gyroscope is to be significantly reduced.

Currently, magnetic shields are usually manufactured in two pieces for ease of fabrication and assembly. Prior art magnetic shields are typically assembled such that the two pieces are connected at a seam perpendicular to a longitudinal axis of the magnetic shield. Furthermore, fiber optic gyroscopes are usually oriented within the magnetic shield such that the direction of the sensing axis of the fiber optic coil is aligned with the longitudinal axis of the magnetic shield. Due to the orientation of the seam in prior art magnetic shields, this method of assembly creates a discontinuity in a magnetic flux path parallel to the sensing axis, reducing the shielding effectiveness in that direction. As a result, the most sensitive orientation of the depolarized fiber optic gyroscope sensing coil may be parallel to the least effective orientation of the magnetic shield.

Accordingly, it is desirable to have a magnetic shield for a fiber optic gyroscope with an improved mating design that overcomes the above deficiencies associated with the prior art.

DETAILED DESCRIPTION

Figure 1:
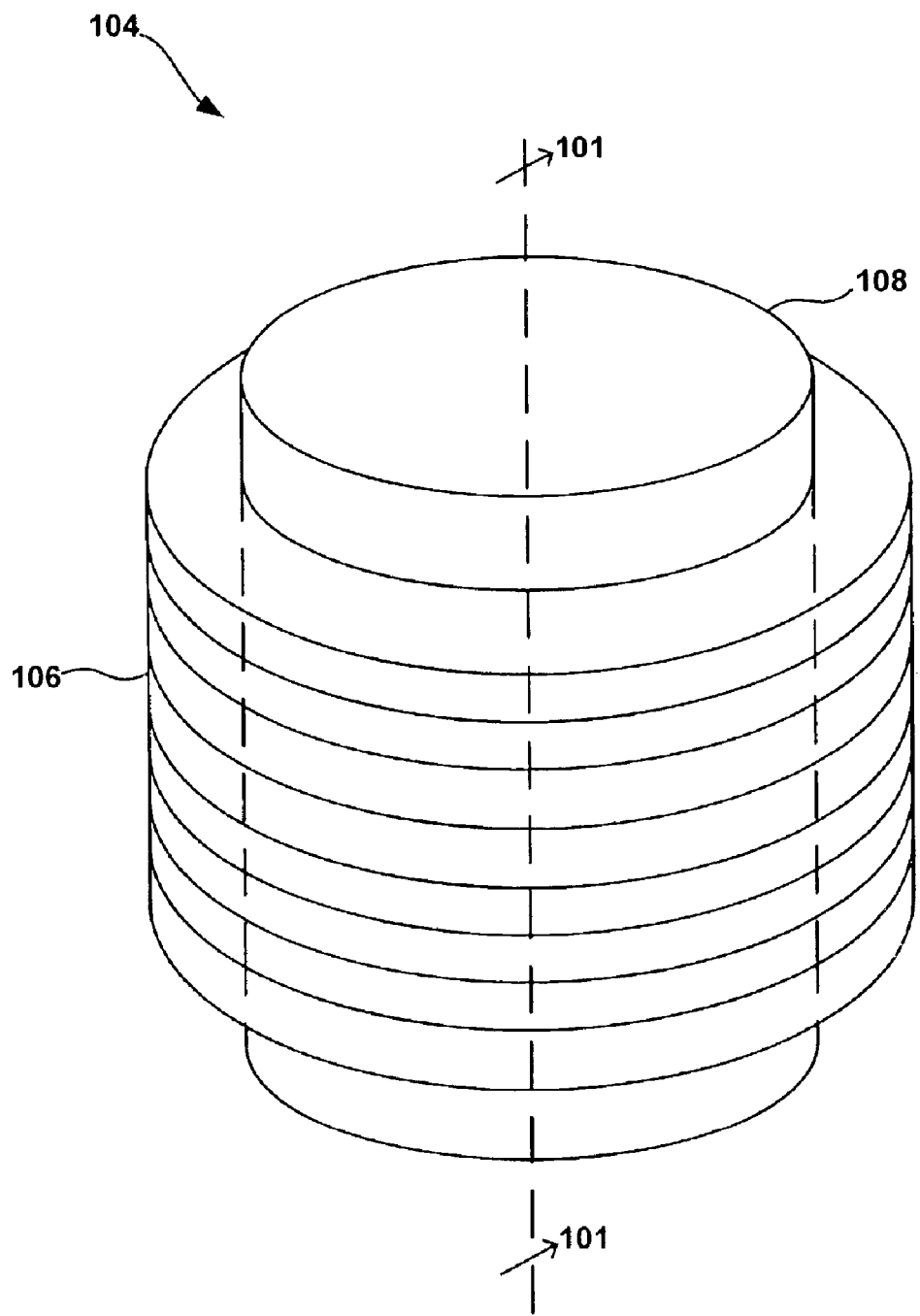
FIG. 1 is a perspective view of an exemplary fiber optic gyroscope sensing coil.

FIG. 1 shows an exemplary sensing coil 104 for a fiber optic gyroscope (not shown) having a sensing axis 101—101. In the present embodiment, the sensing coil 104 may include a length of optical fiber 106 wrapped in multiple layers around a spool 108 in the longitudinal and radial directions of the coil 104. It should be understood that any number of layers of optical fiber may be utilized with the sensing coil 104.

Additionally, in the present embodiment, the sensing axis 101—101 may be the direction of rotation sensitivity of the sensing coil 104. Thus, the sensing coil 104 may detect rotational movement about the sensing axis 101—101. Although the sensing axis 101—101 is shown as substantially parallel to the longitudinal axis of the sensing coil 104 in FIG. 1, it should be understood that the direction of the sensing axis 101—101 may vary in alternate embodiments (e.g., along a radial direction of the sensing coil 104).

In addition, although the exemplary sensing coil 104 shown in FIG. 1 has a substantially circular cross-section in a plane perpendicular to the sensing axis 101—101, and a substantially rectangular cross section in a plane parallel to the sensing axis 101—101, alternate cross-sections may include other shapes (e.g., elliptical or triangular cross-sections). For more information on sensing coils and fiber optic gyroscopes, one can refer to U.S. Pat. No. 4,408,882, the contents of which are incorporated in its entirety herein by reference.

Figure 2:
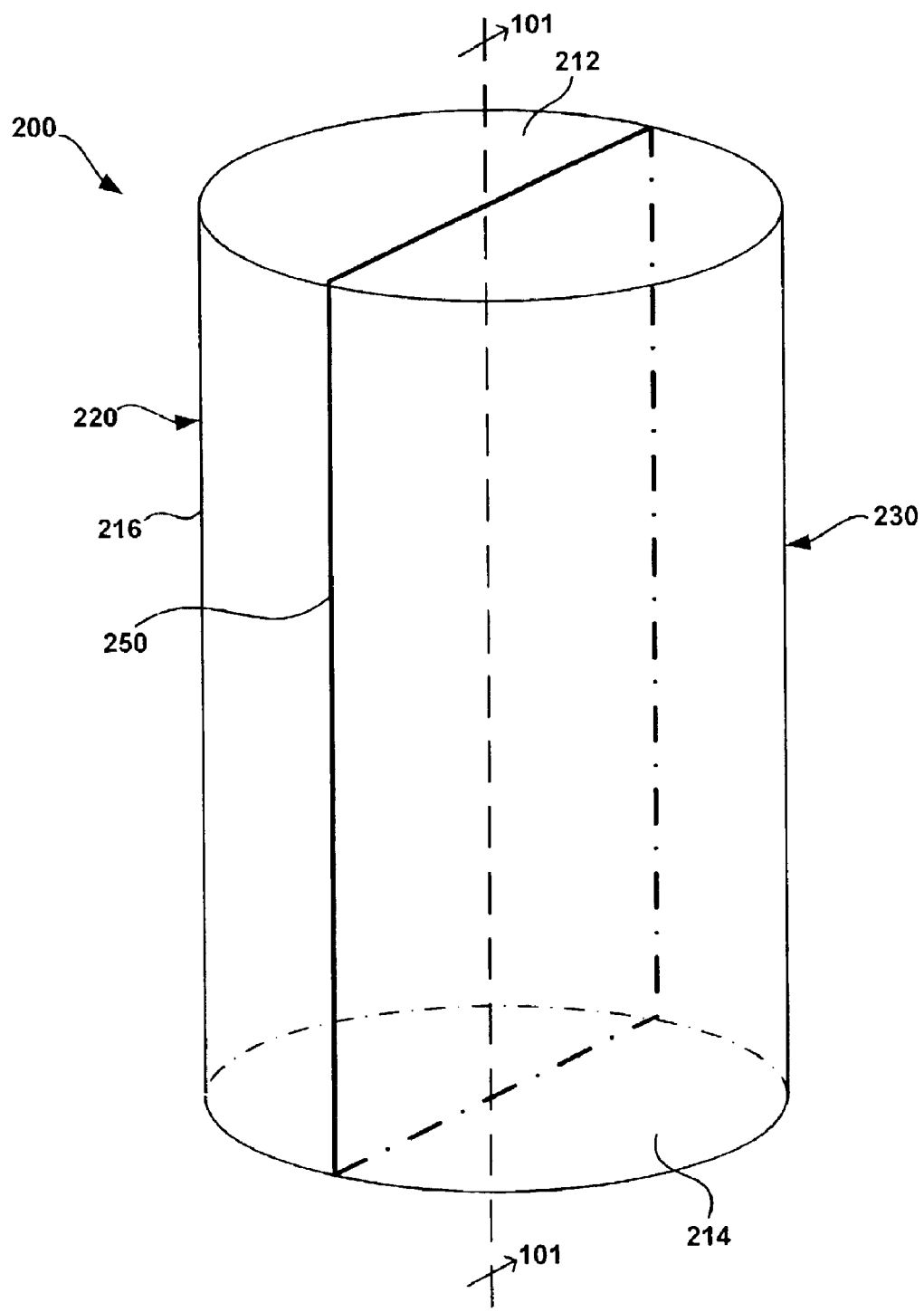
FIG. 2 is a perspective view of an exemplary magnetic shield for a fiber optic gyroscope, with the orientation of the sensing coil from FIG. 1 shown.

FIG. 2 shows an exemplary magnetic shield 200 forming a layer (e.g., container shell) around the sensing coil 104. Although the sensing coil 104 is not shown in FIG. 2, an exemplary orientation of the sensing coil 104 within the magnetic shield 200 is indicated by the direction of the sensing axis 101—101.

In the present embodiment, the magnetic shield 200 is a thin-walled right circular cylinder with closed ends, with a longitudinal and a radial axis, but other geometries (e.g., a sphere) are also possible. The magnetic shield 200 may have a first side 212 and second side 214 connected to a wall 216. In an alternate embodiment, the corners formed by the sides 212 and 214 and by the wall 216 may include a radius, or fillet, rather than a sharp corner. Additionally, the magnetic shield 200 may be comprised of a nickel-iron alloy with high permeability at a low ambient magnetic field, but other magnetic materials with similar properties may also be suitable.

Due to considerations such as ease of fabrication and assembly, the magnetic shield 200 may include a first piece 220 and a second piece 230 aligned and connected to each other at a seam 250. Both the first piece 220 and the second piece 230 may include a portion of the first side 212, second side 214, and wall 216, as shown in FIG. 2. In the present embodiment, a portion of the seam 250 along the wall 216 may be substantially parallel to the sensing axis 101—101. Furthermore, the seam 250 may define a plane that is substantially parallel to the sensing axis 101—101 of the magnetic shield 200. The seam 250 may be formed such that the planar surfaces of the two pieces 220, 230 of the magnetic shield 200 abut or overlap.

Each of the pieces 220, 230 of the magnetic shield 200 may be fabricated from a single sheet of material by forming processes such as deep-drawing or hydroforming. Alternatively, the first piece 220 and second piece 230 may be fabricated from multiple pieces of material cut and bent to shape, then welded to one another. Following the fabrication process(es), materials suitable for magnetic shielding are typically annealed (a heat-treating process) to develop optimum magnetic properties. Furthermore, both the sensing coil 104 and magnetic shield 200 may be attached to a support structure (not shown) fabricated from non-magnetic material(s) that maintains their orientation and relative positions.

Although portions of the seam 250 may be substantially parallel to the sensing axis 101—101, precise parallelism of the seam 250 and the sensing axis 101—101 is not necessary for effective attenuation of an ambient magnetic field. For example, in an alternate embodiment, the portion of the seam 250 along the wall 216 may have an angular separation of less than substantially 10 degrees from the sensing axis 101—101 of the sensing coil 104. Additionally, although the sensing axis 101—101 is substantially parallel to the longitudinal axis of the magnetic shield 200, this may vary in alternate embodiments.

Figure 3:
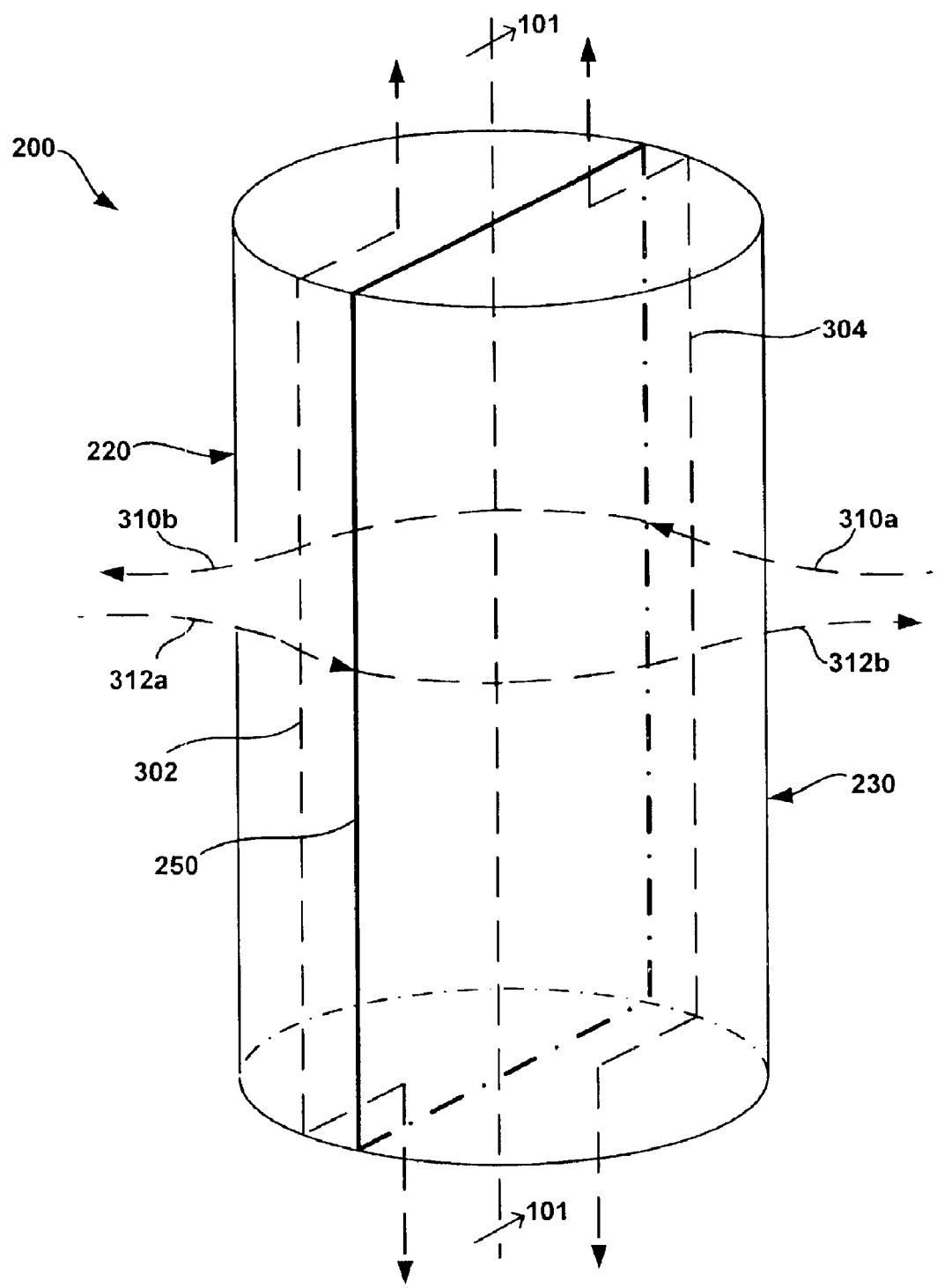
FIG. 3 shows exemplary magnetic flux paths in the magnetic shield of FIG. 2.

FIG. 3 shows exemplary magnetic flux paths through the magnetic shield 200. In the present embodiment, continuous, low reluctance magnetic flux paths may exist in the longitudinal direction of the magnetic shield 200, such as along flux paths 302 and 304. However, flux paths along the radial direction of the magnetic shield 200 may be discontinuous due to the seam 250. For example, flux paths 310*a* and 310*b*, and flux paths 312*a* and 312*b*, respectively, are discontinuous at the seam 250 where the two pieces 220, 230 of the magnetic shield 200 connect.

Figure 4:
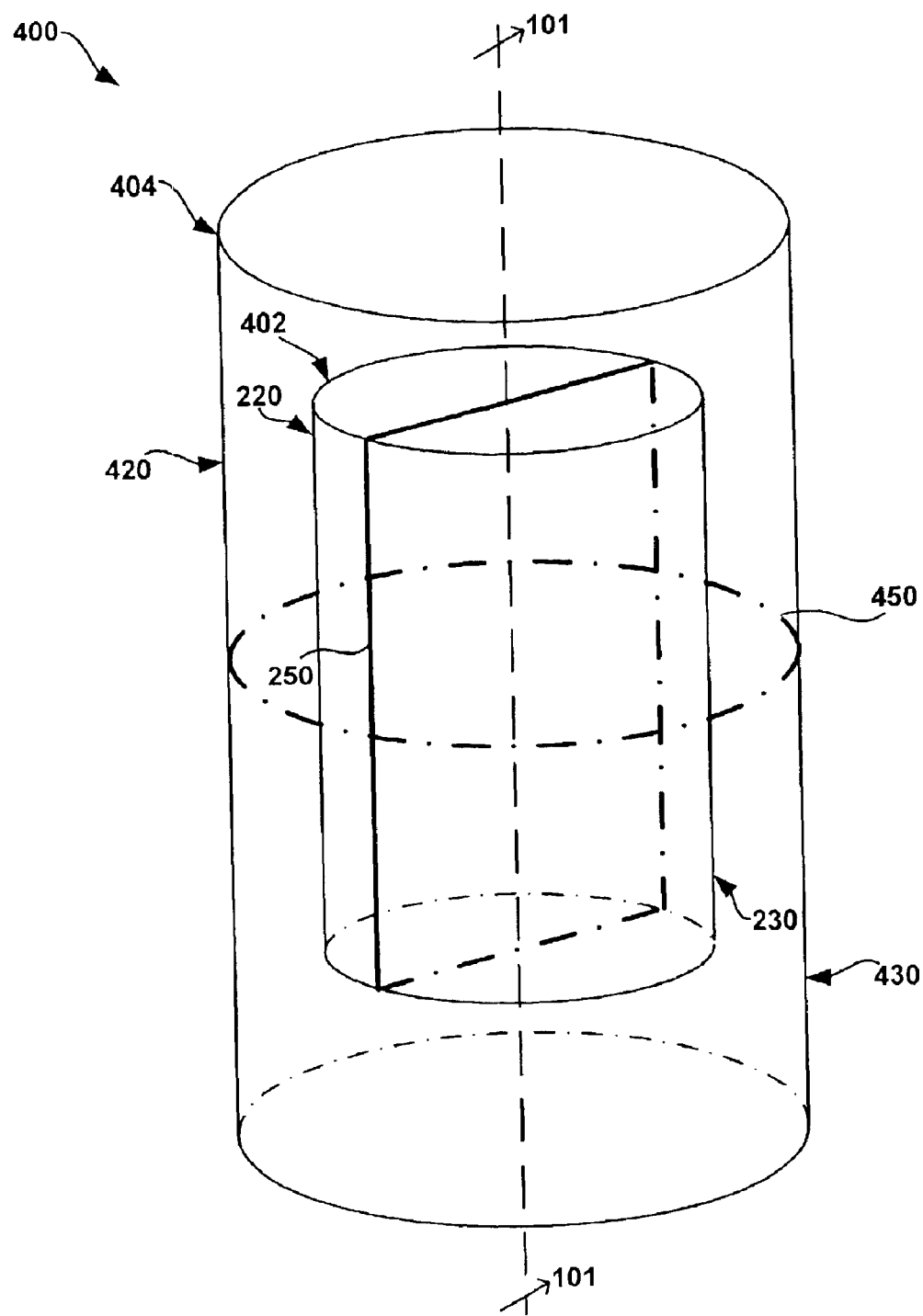
FIG. 4 is a perspective view of another exemplary magnetic shield for a fiber optic gyroscope having multiple layers, with the orientation of the sensing coil from FIG. 1 shown.

Turning now to FIG. 4, another exemplary magnetic shield 400 is shown. The magnetic shield 400 may include a first (e.g., inner) layer 402 and a second (e.g., outer) layer 404 of high-permeability material enclosing the sensing coil 104. Although the sensing coil 104 is not shown in FIG. 4, an exemplary orientation of the sensing coil 104 within the magnetic shield 400 is indicated by the direction of the sensing axis 101—101. In general, multi-layer magnetic shields may provide greater attenuation of an ambient magnetic field, or the ability to attenuate an ambient magnetic field of larger magnitude, compared to single-layer designs.

In the present embodiment, the first layer 402 of the magnetic shield 400 may be substantially the same as the single-layer magnetic shield 200 shown in FIG. 2. The second layer 404 may be a thin-walled right circular cylinder with closed ends, with a longitudinal axis and a radial axis, but other geometries (e.g. a sphere) are possible. In the present embodiment, the second layer 404 may be comprised of a nickel-iron magnetic alloy with high permeability at a low ambient magnetic field, but other magnetic materials with similar properties may also be suitable.

Due to considerations such as ease of fabrication and assembly, the second layer 404 of the magnetic shield 400 may include a third piece 420 and a fourth piece 430 aligned and connected to each other at a seam 450. The seam 450 may define a plane that is perpendicular to the longitudinal axis of the second layer 404. Further, the seam 450 may be formed such that the planar surfaces of the two pieces 420, 430 of the second layer 404 abut or overlap.

Similar to the first layer 402, the third and fourth pieces 420, 430 of the second layer 404 may be fabricated from a single sheet of material by forming processes such as deep-drawing, or hydroforming. Alternatively, the pieces 420, 430 may be fabricated from multiple pieces of material cut and bent to shape, then welded to one another. Following the fabrication process(es), materials suitable for magnetic shielding are typically annealed (a heat-treating process) to develop optimum magnetic properties.

Furthermore, both the sensing coil 104 and magnetic shield 400 may be attached to a support structure (not shown) fabricated from non-magnetic material(s) that maintains the orientation and relative positions of the sensing coil 104 and magnetic shield 400. In addition, the first and second layers 402, 404 of the magnetic shield 404 may be attached to an intermediate support structure (not shown) fabricated from non-magnetic material(s) that maintains their orientation and relative positions.

FIG. 4 also shows that the sensing axis 101—101 of the sensing coil 104 is oriented substantially parallel to the longitudinal axis of both the first and second layers 402, 404 of the magnetic shield 400. However, precise parallelism of the sensing axis 101—101 and the longitudinal axes of the first and second layers 402, 404 is not necessary for effective attenuation of an ambient magnetic field.

Additionally, FIG. 4 also shows the seam 450 on the second layer 404 may be substantially perpendicular to the sensing axis 101—101 of the sensing coil 104, though precise perpendicularity of the seam 450 and the sensing axis 101—101 is not necessary for effective attenuation of an ambient magnetic field. For example, in an alternate embodiment, the second layer 404 may include a seam 450 having an angular separation of more than substantially 80 degrees from the sensing axis 101—101 of the sensing coil 104.

It should be understood that alternate embodiments of the multi-layer magnetic shield 400 may include more than two layers of high-permeability material (e.g., three layers). Furthermore, in an alternate embodiment, the second layer 404 may enclose the first layer 402 of the magnetic shield 400, so that seam 250 is along an outer layer and seam 450 is along an inner layer. Additionally, alternate orthogonal orientations of the seams 250, 450 in each of the layers 402, 404, respectively, are also possible.

Figure 5:
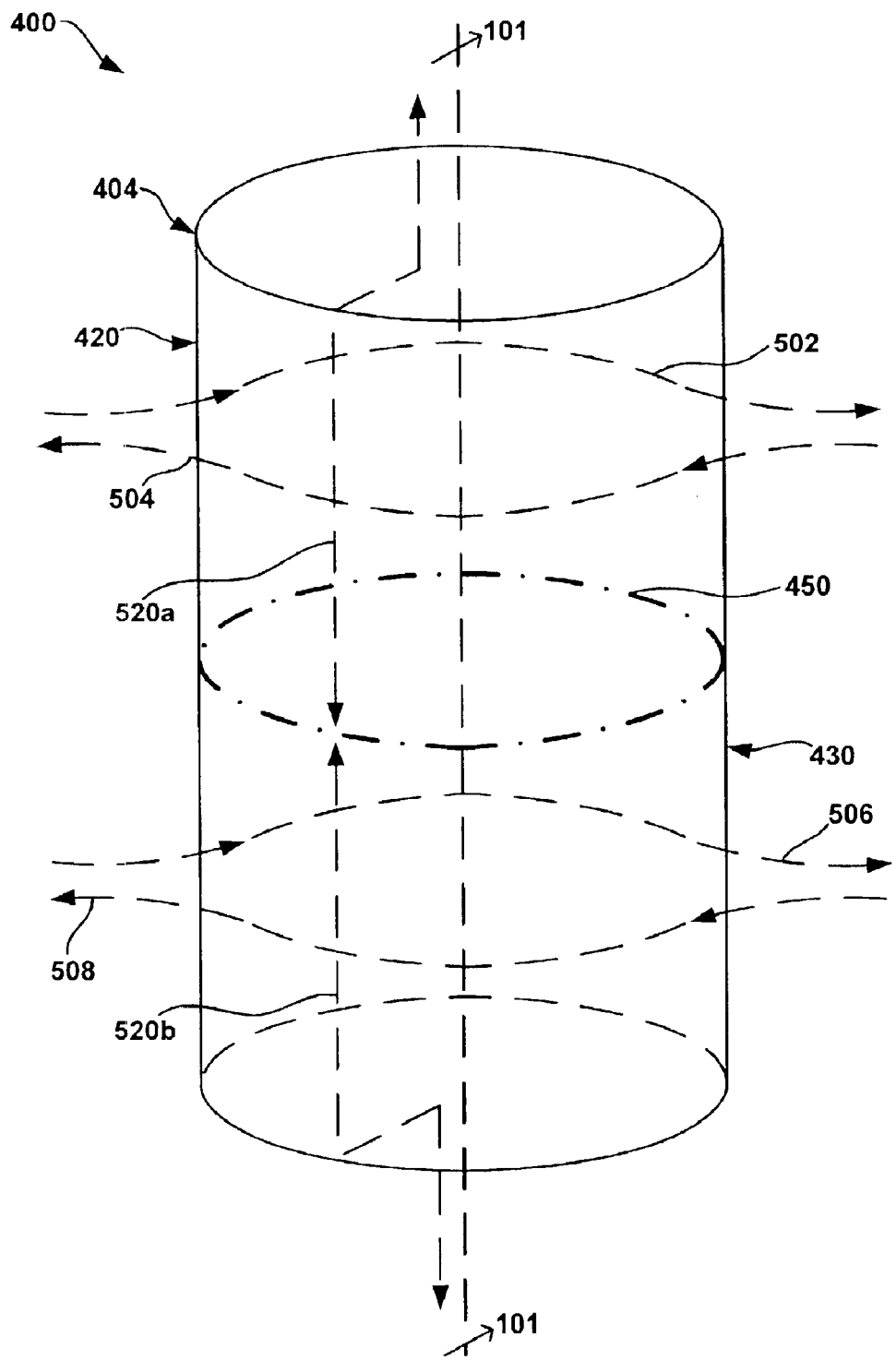
FIG. 5 shows exemplary magnetic flux paths in the magnetic shield of FIG. 4.

FIG. 5 shows exemplary magnetic flux paths on the second (e.g., outer) layer 404 of the magnetic shield 400. Exemplary flux paths along the first (e.g., inner) layer 402 of the magnetic shield 400 may be substantially the same as the flux paths for the magnetic shield 200 shown in FIG. 3.

In the present embodiment, continuous, low reluctance magnetic flux paths may exist in the radial direction of the second layer 404 of the magnetic shield 400, such as along flux paths 502, 504, 506, and 508. Thus, magnetic flux may travel radially along the second layer 404 without being interrupted by the seam 450. On the contrary, magnetic flux traveling along the longitudinal direction of the second layer 404 may encounter a discontinuity caused by the seam 450, as shown by exemplary flux paths 520*a* and 520*b*. It should be understood that the flux paths described in the present embodiments are merely exemplary, and any number of different flux paths may be present within either of the magnetic shields 200 or 400.

Having described the structure and connectivity of the present embodiment, its method of operation and advantages may now be discussed. For the magnetic shield 200, magnetic flux from an ambient magnetic field may travel continuously along the direction of the sensing axis 101—101 along the flux paths 302, 304. Thus magnetic flux may travel continuously on the magnetic shield 200 parallel to the direction of the sensing axis 101—101.

As described earlier, the most sensitive direction for depolarized fiber optic gyroscope operations is typically parallel to the sensing axis 101—101 of the sensing coil 104. Thus, it may be advantageous for the magnetic shielding to be effective in the direction parallel to the sensing axis 101—101 if the negative effect of an ambient magnetic field is to be significantly reduced. By enabling magnetic flux to travel continuously along magnetic flux paths 302, 304, which are substantially parallel to the direction of the sensing axis 101—101, the magnetic shield 200 may protect the sensing coil 104 from ambient magnetic flux traveling along this direction. Therefore, in the present embodiment, the most effective orientation of the seam 250 of the magnetic shield 200 may be substantially parallel to the sensing axis 101—101.

The exemplary magnetic shield 400 also has various advantages. The first layer 402 of the magnetic shield 400 may enable magnetic flux to travel continuously parallel to the direction of the sensing axis 101—101 (e.g., along flux paths 302, 304). Additionally, the second layer 404 of the magnetic shield 400 may enable magnetic flux to travel continuously perpendicular to the direction of the sensing axis 101—101 (e.g., along flux paths 502–508). Since magnetic flux is less likely to "leak in" through both orthogonal seams 250, 450, the effectiveness of magnetic shield 400 may be especially high.

It should be understood that a wide variety of changes and modifications may be made to the embodiments of the magnetic shields 200, 400 described above. For example, in an alternate embodiment, the sensing coil 104, and/or magnetic shields 200, 400 may be a different geometry (e.g., rectangular prisms). Furthermore, the magnetic shields 200, 400 may enclose the entire fiber optic gyroscope, though only the sensing coil 104 may be enclosed in alternate embodiments. Additionally, in an alternate embodiment, a single piece may be connected with itself at a seam to form a wall of a magnetic shield, and the seam may be substantially parallel to the sensing axis 101—101 of the sensing coil 104. In addition, it should be understood that the present embodiments may be utilized with any type of optical gyroscope (e.g., ring laser gyroscope) or device that utilizes sensing coils. It is therefore intended that the foregoing description illustrates rather than limits this invention, and that it is the following claims, including all equivalents, which define this invention.

What is claimed is:

1. A system for magnetically shielding exactly one fiber optic gyroscope, the system comprising:
   exactly one fiber optic gyroscope having a sensing coil with a sensing axis; and
   a magnetic shield including a plurality of layers each fabricated from a magnetic material and enclosing the exactly one fiber optic gyroscope;
   wherein each of the layers includes a first piece and a second piece, the first piece and second piece are aligned and connected at a seam, and at least a portion of the seam has an angular separation of less than substantially 10 degrees from the sensing axis of the sensing coil.

2. The system of claim 1 wherein the magnetic material comprises a nickel-iron magnetic alloy.

3. The system of claim 1, wherein a flux path is continuous along each layer, and has an angular separation of less than substantially 10 degrees from the sensing axis.

4. The system of claim 1, wherein the magnetic shield and the sensing coil are attached to a support structure fabricated from a non-magnetic material.

5. A magnetic shield for a single sensing coil with a sensing axis, the magnetic shield comprising:
   a first layer and a second layer enclosing the single sensing coil;
   wherein the first layer includes a first piece and a second piece connected by a first seam, and the second layer includes a third piece and a fourth piece connected by a second seam, a portion of the first seam is substantially parallel to the sensing axis, and a portion of the second seam is substantially perpendicular to the sensing axis.

6. The magnetic shield of claim 5 wherein the first layer and second layer comprise a high-permeability magnetic material.

7. The magnetic shield of claim 6, wherein the high-permeability magnetic material comprises a nickel-iron magnetic alloy.

8. The magnetic shield of claim 5, wherein the first seam and the second seam are orthogonal.

9. The magnetic shield of claim 5, wherein the first layer has a continuous flux path that is substantially parallel to the sensing axis, and the second layer has a continuous flux path that is substantially perpendicular to the sensing axis.

10. The magnetic shield of claim 5, wherein the first layer and second layer are attached to an intermediate support structure fabricated from a non-magnetic material.

11. The magnetic shield of claim 10, wherein the magnetic shield encloses only the sensing coil and the intermediate support structure.

12. The magnetic shield of claim 5 further comprising a third layer enclosing the fiber optic gyroscope.

13. A magnetic shield for a sensing coil, the magnetic shield comprising:
   a plurality of layers enclosing the sensing coil, each layer having a first side and a second side connected by a wall;
   wherein each of the plurality of layers includes a plurality of pieces, and each of the plurality of pieces includes a portion of each of the first side, the second side, and the wall.

14. The magnetic shield of claim 13 wherein the at least one layer comprises a high-permeability magnetic material.

15. The magnetic shield of claim 14, wherein the high-permeability magnetic material comprises a nickel-iron magnetic alloy.

16. The magnetic shield of claim 13 wherein at least one pair of the plurality of layers is attached to an intermediate support structure fabricated from a non-magnetic material.

17. The magnetic shield of claim 13, wherein the sensing coil is part of a single fiber optic gyroscope enclosed by the magnetic shield.

18. The magnetic shield of claim 13, wherein a flux path is continuous on each layer and substantially parallel to the sensing axis.

19. The magnetic shield of claim 1, wherein the seam defines a plane, and the plane is substantially parallel to the sensing axis.

20. The magnetic shield of claim 13, wherein the magnetic shield comprises a thin-walled right circular cylinder with closed ends.

21. The magnetic shield of claim 13, wherein the magnetic shield encloses a second sensing coil having a second sensing axis, wherein the portion of the seam is substantially parallel to the second sensing axis.

* * * * *